W. BROWN,
Assignor, by mesne assignments, to THE MANHATTAN BRASS COMPANY.
LAMP.
No. 9,936. Reissued Nov. 22, 1881.
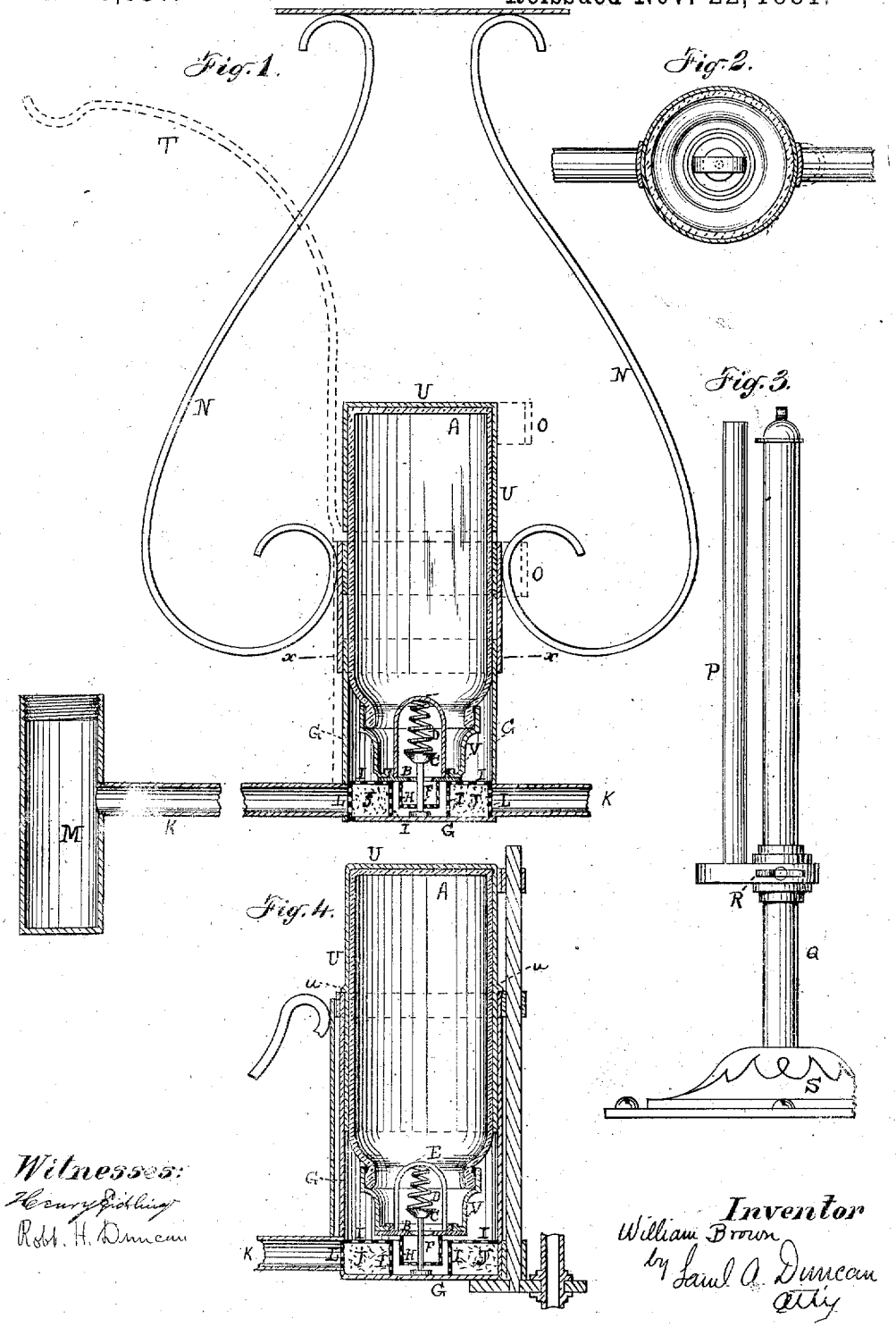
Witnesses:
Henry Sibling
Robt. H. Duncan
Inventor
William Brown
by Saml A. Duncan
Atty

UNITED STATES PATENT OFFICE.

WILLIAM BROWN, OF NEWBURYPORT, MASSACHUSETTS, ASSIGNOR, BY MESNE ASSIGNMENTS, TO THE MANHATTAN BRASS COMPANY, OF NEW YORK, N. Y.

LAMP.

SPECIFICATION forming part of Reissued Letters Patent No. 9,936, dated November 22, 1881.

Original No. 124,249, dated March 5, 1872. Application for reissue filed August 27, 1881.

*To all whom it may concern:*

Be it known that I, WILLIAM BROWN, of Newburyport, in the county of Essex and State of Massachusetts, have invented a new and useful Improvement in Lamps; of which the following is a specification.

The present invention relates to the class of lamps provided with removable fountains or reservoirs; and it has for its object to furnish an improved lamp which shall be simple in construction, convenient in use, reliable in operation, and safe from explosion.

The invention consists, as to one of its principal features, in the use of glass in the construction of the fountain, which material, when thus used, is found to contribute largely to the practical utility of lamps of this class, as is hereinafter more fully explained.

The invention also consists in a peculiarly-constructed support for the lamp when used as a stand or bracket lamp; and it consists, further, in the use of wire-gauze screens or guards, as hereinafter explained, to prevent the communication of flame from the burners to the fluid within the reservoir or fount.

In the accompanying drawings, Figure 1 is a central vertical section of my improved lamp arranged as a chandelier, one of the burner-receptacles being broken away. The dotted lines in this figure indicate changes capable of being made in the external construction to adapt the lamp to use as a stand or a bracket lamp. Fig. 2 is a horizontal section of the lamp, taken along line *x x* of Fig. 1. Fig. 3 is a view of a stand for supporting the lamp.

Similar letters of reference in the several figures indicate corresponding parts.

Referring to the drawings, A is the reservoir or fount in which the oil is placed. This reservoir is filled through an opening in its bottom, which opening is closed with a screw-cap, B. The cap B, which cap is attached to the reservoir by means of metallic collar cemented to the lip of the contracted mouth of the reservoir, is made with a hole through it, which is closed with a valve, C. This valve is held to its seat by a coiled spring, D, one end of which is attached to the valve and its other end to a loop or bail, E, secured to the said cap B. The stem F of the valve passes out through an opening in the cap B, and has a knob or foot on its outer end, which, when the reservoir is in place, bears against the bottom of the receiver G, so that at such time the weight of the reservoir, pressing downward, holds the valve C away from its seat and allows the oil to flow out freely. Should the lamp be overturned and the fountain thrown out of the receiver, the valve C will instantly be closed by the spring D, and thus the escape of oil be prevented.

To the under or outer side of the cap B, around the opening in said cap, is attached a wire-gauze or finely-perforated sheet-metal cap or guard, H, which prevents the possibility of flame entering the reservoir A I I is a ring-partition, made of finely-perforated sheet metal and arranged in the bottom of the receiver G, so as to inclose an annular space next to the walls of such receiver. The central space within this ring-partition is large enough to admit the stem of the valve C, and also the perforated cap H surrounding the valve-opening. The shoulders or horizontal parts of said ring-partition I I should be of such a height that, when the valve-stem F has been pushed inward a sufficient distance to open the valve C, the cap B, or bottom of the reservoir A, may rest upon the said partition, as shown in Fig. 1, and thus relieve the spring D from having to support the entire weight of the reservoir and its contents.

The annular chamber J, formed by the ring-partition I I around the outer part of the bottom of the receiver, is to be filled with fine sand or other suitable material, through which the oil filters as it passes to the burners.

K K are pipes leading from the receiver G to the burners, and the inner ends of which are closed with a wire-gauze or finely-perforated sheet-metal partition, L, which prevents the sand or other packing from escaping through the pipes K K, and at the same time prevents the possibility of flame entering the receiver G, even should an explosion occur at the burners.

To the outer ends of the pipes K K are attached receptacles M, which receive the oil from the pipes K K, and also receive the wicks by which the oil is conveyed to the burners, the burners being screwed into the upper ends of the receptacles in the same manner in which they are ordinarily screwed into a lamp-collar. The pipes K K may be made of any desired length, so that when the lamp is used on railroad-cars the reservoir A and receiver G may be placed at any desired distance from the burners, or even outside of the cars.

In the case of a lamp-chandelier, the arms or frame N N are attached to the lamp in the manner shown in full lines in Fig. 1, the receiver G being screwed into or otherwise detachably attached to the ring or base of the arms or frame N N, so that the receiver and burners may be taken down when required for trimming the wicks or for other purposes.

In the case of a bracket or stand lamp, loops O O, adapted to receive a pivot, P, Fig. 3, are attached externally to the walls of the receiver and of the reservoir, as shown in dotted lines in Fig. 1, so that the lamp may be turned from side to side to throw the light as may be required. The pivot P may be secured to the wall of the room permanently, or it may have a hole through its base to receive the standard Q of a portable stand, in which case it is secured in place by a set-screw, R, so that it may be turned from side to side and moved up and down, as may be desired.

S is the base or foot of the stand, and this base may have screw-holes in it, so that by reversing the position of the pivot P upon the standard Q the base may be screwed to the ceiling, thus enabling the lamp to be used as a hanging lamp.

T is a wire arm attached to the receiver G and curving upward and outward over the burner to support a heat and smoke protector. Thus attached, it always turns with the lamp, so as to keep the protector over the burner.

The reservoir A is preferably made of glass, and, as shown in the drawings, it may be provided with metal fittings. As thus shown, the body of the reservoir is of glass, while the upper part of this glass body, being the part that rises above the top of the receiver G, is covered with a metal cap, U, which serves to protect the fragile and otherwise exposed upper part of the reservoir or fountain, the lower part being protected by the walls of the metal receiver G. The mouth of the glass body is contracted and made thicker than the walls. This is to provide for seating the metallic collar V, which in turn receives the screw-cap B. The contraction of the mouth of the reservoir leaves a sufficient space between the lip of such contracted mouth and the interior of the receiver for seating the metal collar V without enlarging the receiver, and thus destroying its cylindrical form. The advantages connected with making the reservoir of glass are obvious. In the first place, the walls of the reservoir are perfectly air-tight, and without that tendency to develop small air-holes that always exist as a serious evil in the case of metallic reservoirs; secondly, not only is glass less expensive than metal for this purpose, but when the reservoir is made of the former material it can be cleaned much more readily than if of metal; thirdly, the transparent nature of glass permits ready inspection of the reservoir to ascertain the quantity of oil remaining in it, without removing it entirely from the receiver; fourthly, when the reservoir is made of glass, a person in filling it can constantly watch the rise of the oil inside, and thus easily and perfectly guard against any overflow. With a metal reservoir this is difficult.

Instead of constructing the parts so that the bottom of the fountain will rest upon the partition I I at the bottom of the receiver, as shown in Fig. 1, the parts may be so made that the fountain will be suspended from the top of the receiver. This is accomplished by providing the metal cover U, that protects the upper part of the fountain, with a bead or shoulder so placed as to come in contact with the rim of the receiver before contact occurs at the bottom. With such construction the glass of the fountain is less liable to be broken than if the weight of the fountain and its contents were to rest upon the bottom of the receiver. This modified construction is illustrated in section in Fig. 4, in which the cover U is provided with the bead *u*, the lower end of the cover extending downward somewhat below the bead and entering the upper end of the receiver.

What is claimed as new is—

1. In combination with the receiver of a fountain-lamp, a reversible fountain or reservoir made of glass.

2. In combination with the glass reservoir of a fountain-lamp, a metallic cap or sheath for protecting the exposed part thereof, substantially as described.

3. In combination with the glass reservoir of a fountain-lamp, a bead or shoulder, arranged substantially as shown, and serving as a stop to arrest the descent of the fountain within the receiver and sustain its weight.

4. The combination, in a fountain-lamp, of a receiver, a reversible reservoir constructed with a contracted mouth entering within the receiver, and a valve mechanism arranged below the mouth of the reservoir and attached thereto by means of a collar, which embraces the lip of the contracted mouth, substantially as described.

5. The reversible stand and pivot Q P, constructed substantially as shown and described, to adapt the lamp for use as a standing or as a hanging lamp.

6. In combination with the receiver of a fountain-lamp, an annular filtering-chamber arranged in the base thereof, substantially as and for the purpose described.

7. The wire screens or finely-perforated sheet-metal guards H I L, arranged between the fountain and the feed-pipes K K, for the purpose described.

WILLIAM BROWN.

Witnesses:
H. G. JOHNSON,
JOSEPH C. PETTINGEL.